Patented Aug. 26, 1941

2,253,999

UNITED STATES PATENT OFFICE 2,253,999

STABILIZATION OF THE ACIDITY OF FORMALDEHYDE SOLUTIONS

Philip I. Bowman and John Burton, Passaic, N. J., assignors to Heyden Chemical Corporation, New York, N. Y., a corporation of New York No Drawing. Application June 3, 1939, Serial No. 277,254

5 Claims. (Cl. 202—52)

The ordinary commercial aqueous formaldehyde solution made by the catalytic oxidation of methanol contains about 37% to 40% of formaldehyde, about 8% to 10% of methanol by weight, and most of the remainder is water. In addition to the three main constituents above referred to, there is a small amount of formic acid which it is difficult, if not impossible, to completely remove.

It is well known that the acidity of such solutions will ordinarily progressively increase as time goes on after the manufacture. Such increase in acidity is of little or no consequence where the formaldehyde is used for many industrial purposes, such as disinfecting, embalming, etc. For other uses, such as the manufacture of resins, it is extremely important that the acidity remain constant, as any change in acidity necessitates corresponding changes in the proportions of other ingredients used in making the resin.

It is well known that increasing acidity in some cases is due to the Cannizzaro reaction. Two molecules of formaldehyde react with one molecule of water to form formic acid and methanol, the reaction being:

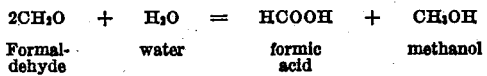

Formaldehyde water formic acid methanol

This reaction does not proceed with any appreciable velocity at room temperature in the absence of a catalyst. However, the reaction is greatly speeded by heat, alkalies and metals such as aluminum, or copper. Commercially, the reaction may be substantially prevented by the storage of the formaldehyde in proper containers, such for instance as those having inert linings, such as rubber, and at room temperature.

We have found that in addition to the effect of the Cannizzaro reaction, which can be prevented by observing the precautions outlined above, there is another important cause of acidity increase. This other important cause of increase in acidity is directly associated with the presence of methyl formate in a percentage in excess of equilibrium and which is produced in the process of formaldehyde manufacture and carried through into the final product.

So far as we are aware, no method has been discovered or developed which will prevent the said increase in acidity upon standing, and which does not involve the addition of any extraneous compounds or ingredients to the solution. Moreover, no one has before discovered the specific relationship between the presence of methyl formate in commercial formaldehyde solution and the progressive increase in acidity independent of that caused by the Cannizzaro reaction.

We have discovered that upon removal of the methyl formate in excess of equilibrium from the formaldehyde solution, there is no longer any increase in acidity, except such as results from the Cannizzaro reaction. As above pointed out, that reaction can be substantially prevented by storage under proper conditions.

It is our belief that the methyl formate present in the formaldehyde in excess of equilibrium unites with water to form formic acid and methyl alcohol, according to the following reaction:

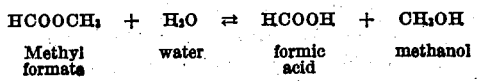

Methyl formate   water   formic acid   methanol and that it is this reaction which causes the progressive increase in acidity until equilibrium is established.

As an important feature of our invention we purify the formaldehyde solution by removing the methyl formate in excess of equilibrium which may be about 0.01%.

A further important feature of our invention involves a simple, inexpensive and effective means for removing the methyl formate. In carrying out our improved method of stabilizing the formaldehyde solution against increase in acidity, a portion of the solution is distilled off under subatmospheric pressure, and at relatively low temperature, such that the methyl formate distills off with the minimum loss of formaldehyde to the distillate leaving a product with minimum increased acidity due to Cannizzaro reaction and minimum metallic contamination from corrosion. The distillation may be conducted as a continuous or as a batch process, and ordinarily it is not necessary to distill off more than 1% to 2% of the solution to give a product of stabilized acidity, that is, one which shows no appreciable variation in acidity in the absence of catalysts which promote the Cannizzaro reaction.

As an example, a formaldehyde solution of the general type above referred to, may be heated to a temperature below its boiling point and fed into a flash chamber maintained under a subatmospheric pressure. The temperature of the incoming solution may be about 60° C., and if so, the vacuum may be about 27 inches of mercury. The rate of delivery to the flash chamber, and the degree of vacuum should be such that about 1% to 2% of the solution distills off, leaving the major portion undistilled, but free of methyl formate. This major portion falls to the bottom of the flash chamber, and is continuously removed, and may be cooled before transferring to storage. The small amount of distillate may come off at about 50° C., due to the cooling effect of the evaporation or distillation, and may be condensed and added to the formaldehyde solutions sold for purposes where change in acidity is of no major consequence, or may be treated in other ways to separate or recover one or more of the constituents thereof. Experience indicates that the absolute pressure should not exceed 100 mm. of mercury, and may be as low as 25 mm. For commercial plant work, about 75 mm. absolute pressure seems best to insure the removal of all of the methyl formate with the minimum distillation of formaldehyde.

We do not wish to be limited to the particular process above described, as the distillation may be effected although less advantageously at other temperatures and pressures.

The new product comprises a formaldehyde solution of stabilized acidity, free of methyl formate in excess of equilibrium concentrations, and likewise free of all constituents not present in the solution as originally produced. This product has particular advantage in all processes where a control of the acidity is required. The absence of other ingredients such as salts of alkali or alkaline earth metals, urea or other compounds, makes the product more valuable in the manufacture of urea formaldehyde resins and other products where the presence of such other ingredients complicates the factors involved in the manufacture, and may adversely affect the quality of such resins or other products.

Having thus described our invention, what we claim as new and desire to secure by Letters Patent is:

1. The method of preventing increase in formic acid content of a formaldehyde solution in methanol and water, and including methyl formate and formic acid as impurities, said method including removing 1 to 2% of the solution by flash distillation under an absolute pressure of about 75 mm. of mercury, and at a temperature of about 60° C.

2. The method of stabilizing the acidity of a commercial solution of formaldehyde in methanol and water, and in which small quantities of formic acid and methyl formate are also present, which includes the step of removing a small fraction of the solution containing substantially all of the methyl formate by flash distillation at a temperature below the normal boiling point of the solution and at subatmospheric pressure and with substantially no change in the relative proportions of the undistilled formaldehyde, methanol and water.

3. The method of stabilizing the acidity of a commercial solution of formaldehyde in methanol and water, and in which small quantities of formic acid and methyl formate are also present, which includes the step of removing 1% to 2% of the solution by distillation at a temperature below the normal boiling point of the solution and at subatmospheric pressure.

4. The method of stabilizing the acidity of a commercial solution of formaldehyde in methanol and water, and in which small quantities of formic acid and methyl formate are also present, which includes the step of distilling off, under subatmospheric pressure, a small portion of the solution together with substantially all of the methyl formate and without substantially changing the relative proportions of the unvaporized formaldehyde, methanol and water.

5. The method of stabilizing the acidity of a commercial solution of formaldehyde in methanol and water, and in which small quantities of formic acid and methyl formate are also present, which includes the step of removing 1% to 2% of the solution together with substantially all of the methyl formate by flash distillation under an absolute pressure not to exceed 100 mm. of mercury and at a temperature between 50° C. and 60° C.

PHILIP I. BOWMAN.
JOHN BURTON.